United States Patent [19]
Neff

[11] 3,811,548
[45] May 21, 1974

[54] STOP MOTION CONVERTER

[76] Inventor: Frederick R. Neff, 2993 Curtis Ave., Des Plaines, Ill.

[22] Filed: Sept. 5, 1972

[21] Appl. No.: 286,014

[52] U.S. Cl. .................. 198/19, 198/106, 198/221
[51] Int. Cl. .............................................. B23q 5/22
[58] Field of Search ............ 198/19, 221, 225, 106; 214/8.5 A

[56] References Cited
UNITED STATES PATENTS

| | | | |
|---|---|---|---|
| 3,179,966 | 4/1965 | Adams | 198/19 |
| 2,525,189 | 10/1950 | Thomas | 198/106 |
| 3,261,449 | 7/1966 | MacKay et al. | 198/221 |
| 1,726,418 | 8/1929 | Aldrich et al. | 198/221 |

*Primary Examiner*—Evon C. Blunk
*Assistant Examiner*—Joseph E. Valenza
*Attorney, Agent, or Firm*—Mason, Kolehmainen, Rathburn & Wyss

[57] ABSTRACT

There is provided a stop motion conveyer for advancing a series of work holders in step-by-step relation to a work station from a continuous supply of work holders, each of the work holders having a plurality of work positions sequentially alignable at the work station. The conveyer includes a table supporting the work holders through their movement past the work station. A drive mechanism is provided reciprocable through advance and return strokes and engageable with a forward one of the work holders. The drive mechanism includes a retracting mechanism for disengaging the drive mechanism during a return stroke. Additionally, a stop mechanism is provided synchronized with the drive mechanism and engageable with the next one of the work holders for retarding the advancement thereof until the drive mechanism has advanced the forward one of the work holders out of the path of travel of the next one of the work holders. Thus, the second and subsequent work holders are biased in abutting relation toward the work station, and the stop means retards the forward movement of the second and subsequent work holders and prevents them from running into and dislocating the forward one of the work holders as it passes through the work station.

4 Claims, 14 Drawing Figures

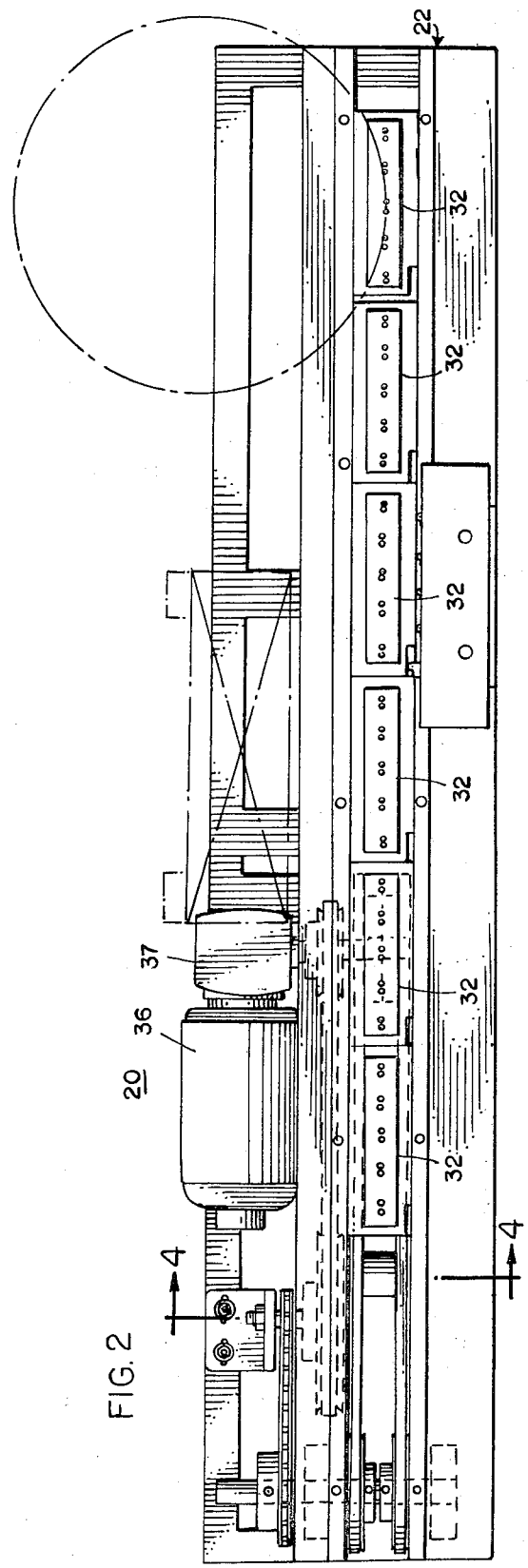
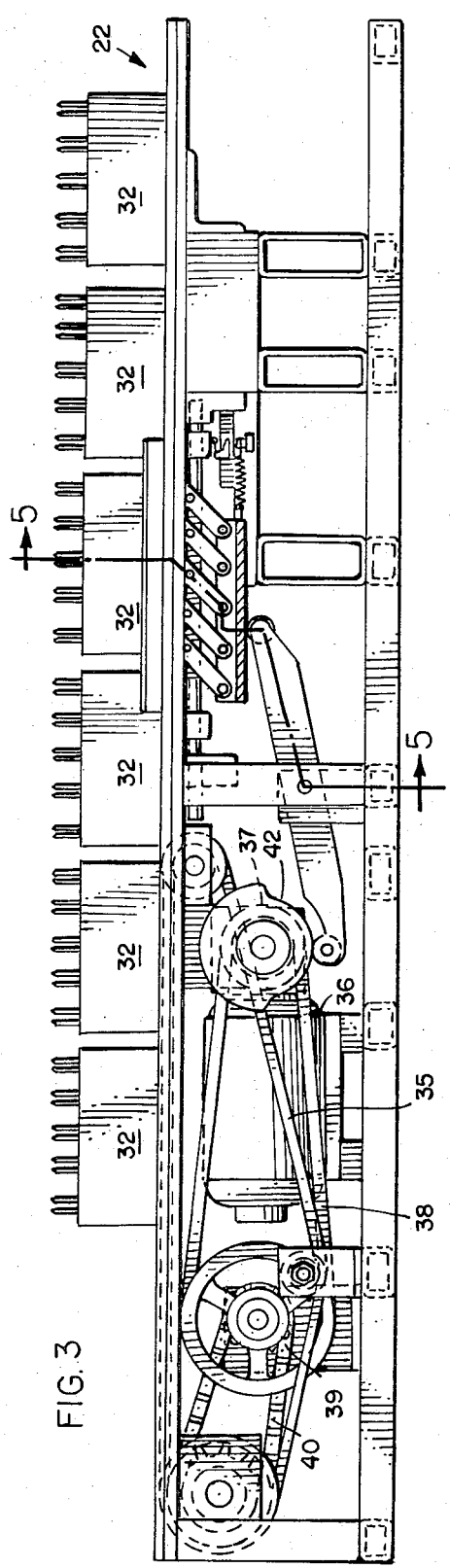
FIG.2
FIG.3

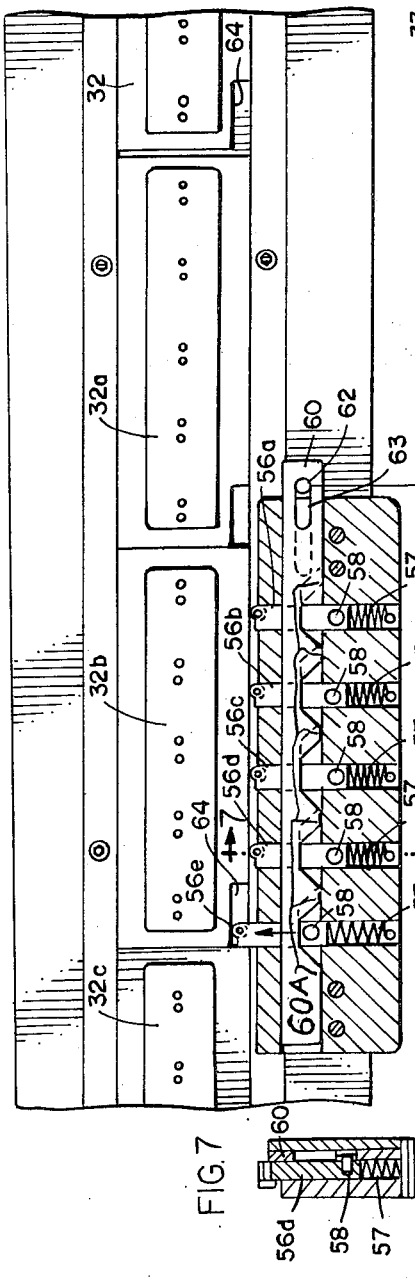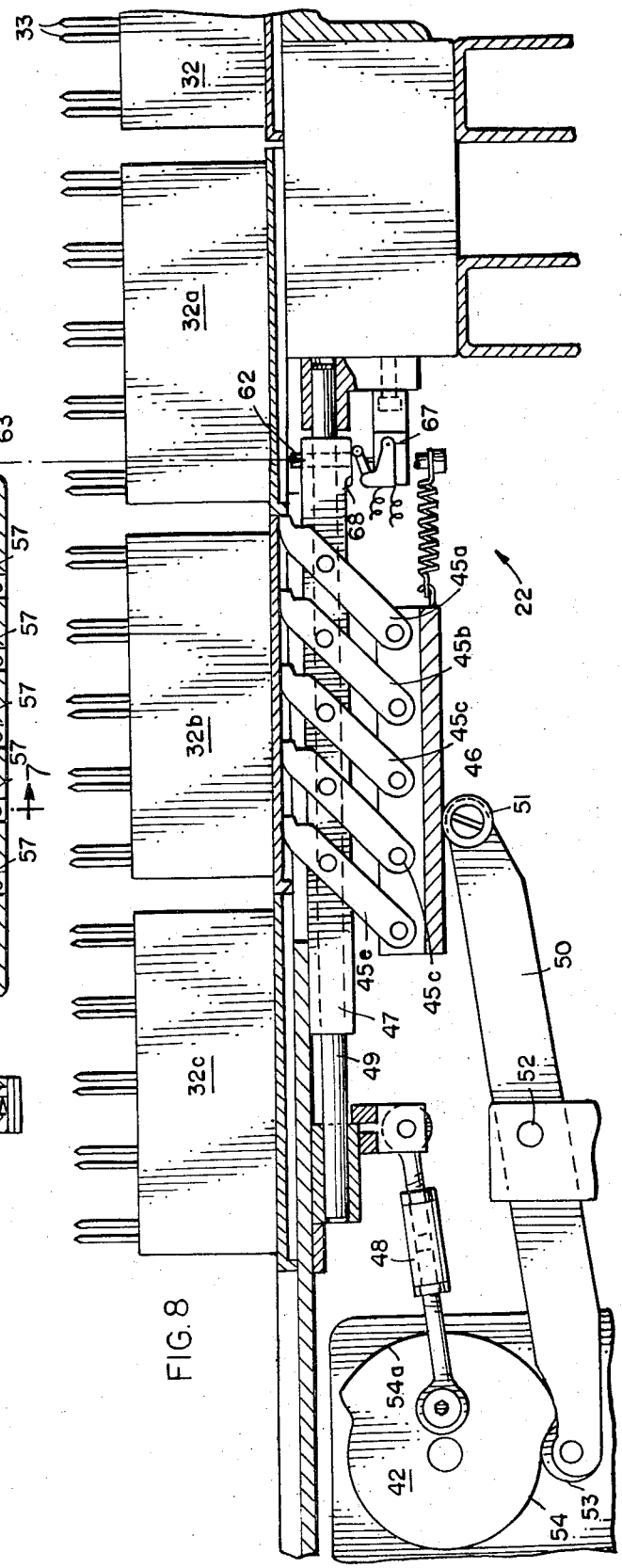

STOP MOTION CONVERTER

The present invention is directed to a new and improved stop motion conveyer and, particularly, to a stop motion conveyer particularly useful in an automatic assembly system.

In the automatic assembly of small parts, such as electrical stack switches, insulated spacers, and thin blades, it is necessary to deliver fixtures or work holders to a work station, to stop at the work station while the work operation is being completed, and then indexed to the next station. Thus, the work station may comprise a dispenser or process. The present stop motion conveyer is particularly adapted for feeding fixtures or work holders past an automatic assembly machine of the type described and claimed in my earlier U.S. Pat. No. 3,463,331 granted Aug. 26, 1969.

Heretofore difficulty has been experienced in the automatic assembling of small parts such as electrical stack switches, insulated spacers, and thin blades with contacts, at a speed and accuracy desired for commercial production. One of the difficulties has been in the accurate alignment of the fixture or work holder at the assembly or work station. Thus, in a typical conveyer system there will be provided a plurality of work holders being advanced toward the work station on a suitable transport mechanism. It is necessary that the forward one of the work holders be separately advanced in step-by-step relation through the work station, while the remaining ones of the plurality of work holders are retarded from abutting advance with the first one of the work holders passing through the work station.

Accordingly, one object of the present invention is to provide a new and improved stop motion conveyer.

Still another object of the present invention is the provision of an improved positioning mechanism for accurately aligning a fixture or work holder at a work station.

Still another object is the provision of a new and improved automatic assembly system for the automatic loading of small devices such as electrical stack switches, insulated spacers, thin blades with contacts, and the like.

Further objects and advantages of the present invention will become apparent as the following description proceeds, and the features of novelty which characterize the invention will be pointed out with particularity in the claims annexed to and forming a part of this specification.

In accordance with these and many other objects of the present invention, there is provided a new and improved stop motion conveyer for positioning a fixture or work holder sequentially through or past a work station. The positioning mechanism includes a table for supporting the work holders in their travel past the work station. A drive mechanism is provided reciprocable through advance and return strokes engageable with a forward one of the work holders and including a retracting means for disengaging the drive mechanism through a return stroke. The drive mechanism includes a plurality of drive fingers sequentially engageable with the work holder during advance strokes thereof so as to drive the forward one of the work holders in step-by-step relation past a work station. In addition, there is provided a stop means synchronized with the drive mechanism and engageable with the second one of the work holders for retarding the advancement thereof until the drive mechanism has advanced the forward one of the work holders out of the path of travel thereof. In this manner, the positioning of the forward one of the work holders is independent of the position of the remainder of the work holders, and the stop means prevents abutting of the remainder of the work holders with the forward one thereof.

For a better understanding of the present invention, reference may be had to the accompanying drawings wherein:

FIG. 1A is a perspective view of a representative part which may be assembled on the assembly system of FIG. 1;

FIG. 2 is a plan view of the automatic assembly system of FIG. 1;

FIG. 3 is a fragmentary elevational view of the automatic assembly system of FIG. 1;

FIG. 6 is a fragementary sectional view of the stop motion conveyer illustrating stop means on the conveyer;

FIG. 7 is a cross sectional view of a stop taken along line 7—7 of FIG. 6;

FIG. 8 is a fragmentary elevational cross sectional view of the stop motion conveyer taken along line 8—8 of FIG. 5.

Figure 1:
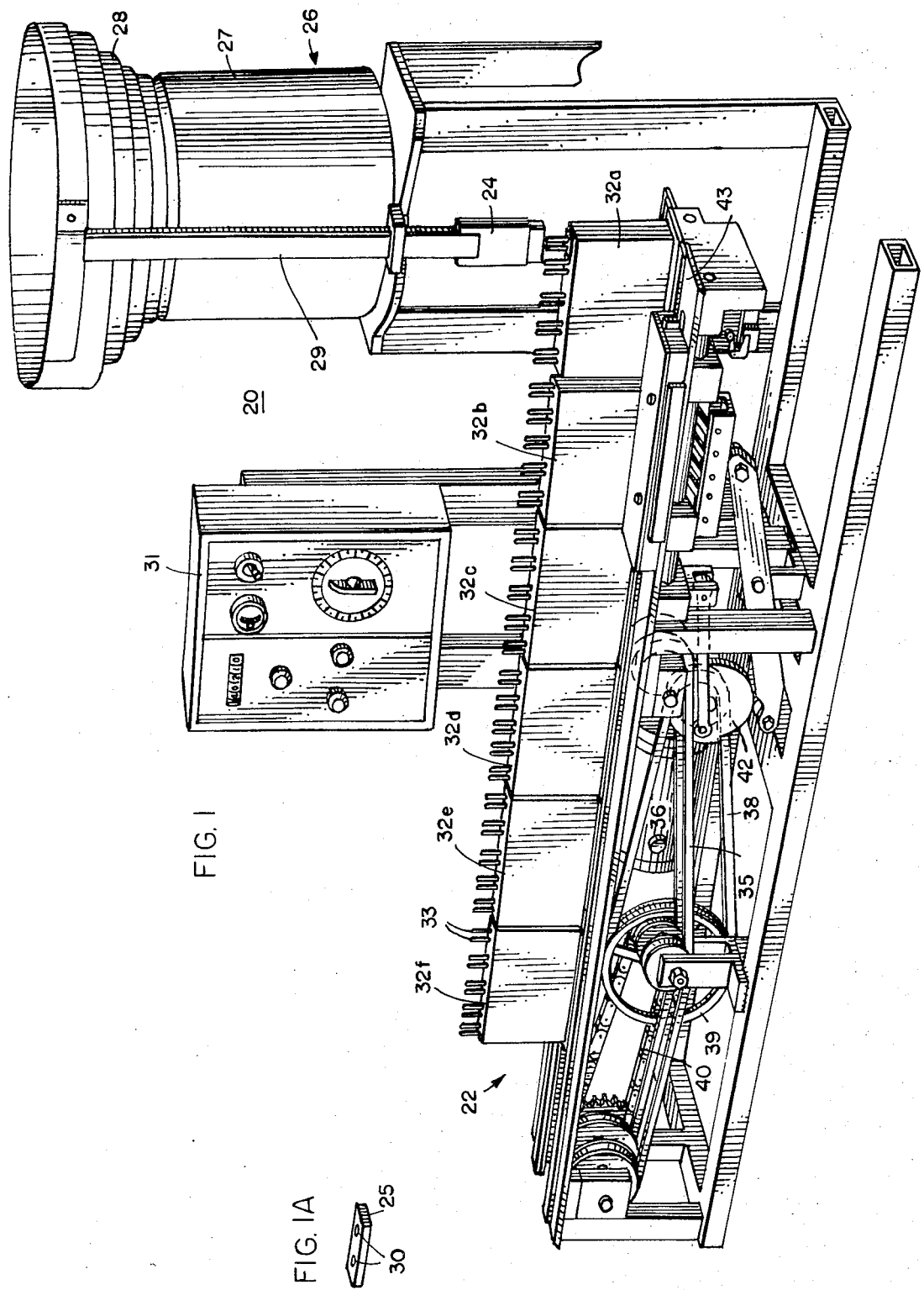
FIG. 1 is a perspective view of an automatic assembly system incorporating a stop motion conveyer according to the present invention.

Referring now to the drawings and particularly to FIG. 1, there is illustrated an automatic assembly system 20 including a stop motion conveyer 22 according to the present invention. The automatic assembly system 20 additionally includes an automatic assembly machine 24 which may be of the type illustrated in my above-mentioned patent, and supplied by suitable parts 25 (FIG. 1A) by means of a feed system 26 including a supply hopper 27, a feed 28, and a supply chute 29 feeding the parts 25 through the automatic assembly machine 24. Although the parts 25 may be of any desired type, such as the above-mentioned small parts of electrical stack switches, insulated spacers, thin blades for contacts, and the like, the particular parts 25 herein illustrated are shown as electrical insulating spacers, each having a plurality of transverse holes 30 shown as two in number to provide for mounting screws or insulating sleeves. A suitable control panel 31 controls the operation and functioning of the automatic assembly system 20.

In the assembly of the parts, the parts 25 are first assembled on suitable fixtures 32A, 32B, and the like, and collectively represented as 32. Each of the fixtures 32 is provided with a plurality of pairs of upstanding prongs or pins 33, each pair representing a work position. A suitable stack of parts 25 is assembled at the work station of the automatic assembly machine 24 on each of the series of pins 33.

Figure 5:
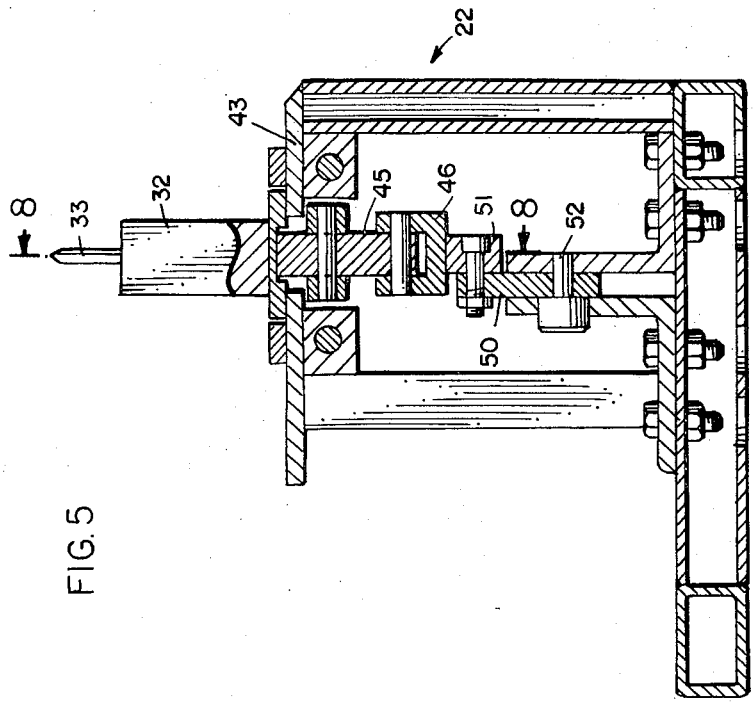
FIG. 5 is a sectional elevational view of the stop motion conveyer of FIG. 1 taken along line 5—5 of FIG. 3.
Figure 4:
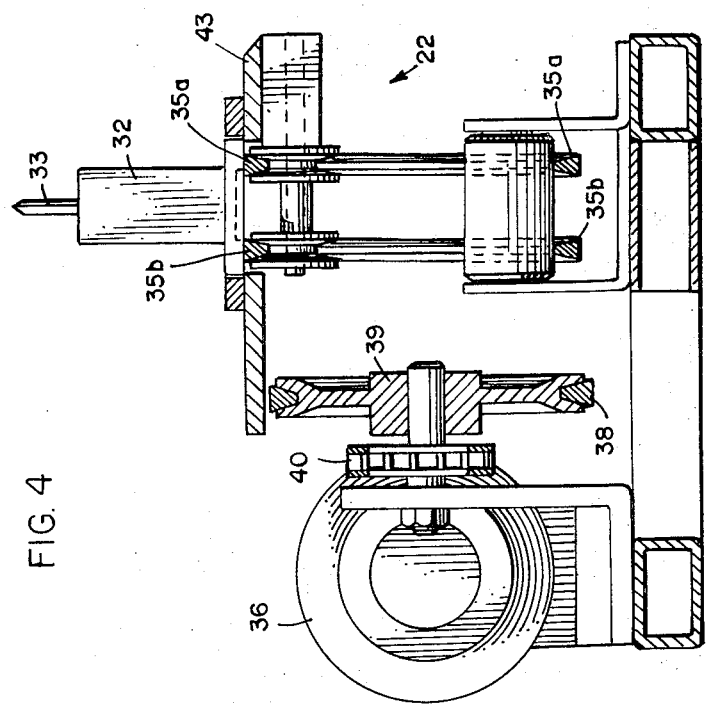
FIG. 4 is a cross sectional elevational view of the stop motion conveyer of FIG. 1 taken along line 4—4 of FIG. 2.

The stop motion conveyer 22 includes a conveyer belt 35 to which are supplied empty ones of the fixtures 32. The conveyer belt 35 in the illustrated embodiment is driven by an electric motor 36 through a gear reducer 37 (FIGS. 2 and 3). In the illustrated embodiment, the conveyer belt 35 is in the form of a pair of spaced apart "V" belts 35A, 35B (FIG. 4), but the conveyer belt 35 may have any conventional form. A drive belt 38 is driven by the gear reducer 37 and in turn drives a pulley and sprocket assembly 39 driving a sprocket chain 40 which in turn drives the conveyer belt 35. The gear reducer 37 also turns a crank and cam assembly 42 for operating the step-by-step advance of fixtures 32 from the conveyer belt 35. The motor 36 and associated drive operates at a speed to provide slight over-drive to the conveyer belt 35, thus providing relative slippage between the conveyer belt 35 and the fixtures 32 carried thereon. The fixtures 32 discharged from the end of the conveyer belt 35 move along a supporting table 43 (FIG. 5) past the work station of the automatic assembly machine 24.

In accordance with the present invention, there is provided a suitable drive mechanism reciprocable through advance and return strokes and engageable with the forward one 32A of the fixtures to provide a step-by-step advance thereof. More specifically, as best illustrated in FIG. 8, the drive mechanism includes the crank and cam assembly 42 operatively connected to control a plurality of drive fingers 45A, 45B, 45C, 45D, and 45E, collectively referred to as 45. Each of the drive fingers 45 has its lower end pivotally connected to a vertically movable support bar 46 and are pivotally mounted in spaced relation intermediate their ends to a reciprocable drive bar 47. The drive bar 47 is connected to the crank and cam assembly 42 by means of a suitable crank or connecting rod 48. The drive bar 47 is slidably mounted on a shaft 49 so that rotation of the crank and cam assembly 42 provides subatantially sinusoidal movement of the drive bar 47. At the same time there is provided suitable means for oscillating the support bar 46 vertically to provide rotation of the drive fingers 45 relative to the drive bar and includes a control lever 50 having a roller 51 engaging the lower end of the support bar 46 and pivotally mounted intermediate its length on a suitable pin 52. The control lever 50 includes a cam follower 53 at its opposite end in engagement with a surface cam 54 on the crank and cam assembly 42. The surface cam 54 includes a lobe or raised portion 54A which will impart counterclockwise pivoting of the control lever 50 and associated disengagement of the fingers 41 from a fixture 32.

To provide for the engagement and disengagement of the drive fingers 45 with a respective fixture 32, the bottom of the fixtures 32 is hollowed out, as best illustrated in FIG. 8, so that as the drive mechanism is reciprocated through advance and return strokes, the fingers 45 are engageable with the forward one 45A of the fixtures and engage a fixture during the advance stroke, disengaging from the fixtures during the return stroke. More specifically, viewing the step of operation in FIG. 8 with the crank and cam assembly 42 turning clockwise, the lobe 54A engages the cam follower 53, pivoting the control lever 50 counterclockwise and retracting the fingers 45 from engagement with a fixture 32. At the same time the drive bar 47 begins its retraction stroke, moving to the left as viewed in FIG. 8. Thus, the fingers 45 will be retracted and moved to the left. As the crank and cam assembly 42 complete approximately in half turn, the lobe 54A will pass the cam follower 53, and the control lever 50 will then rotate clockwise, permitting the support bar 46 to drop and pivoting the fingers 45 back into an engageable position, as illustrated in FIG. 8. Moreover, the drive bar 47 will now begin its forward stroke, to the right as viewed in FIG. 8, so that one of the drive fingers 45 engages a depending flange on the bottom support of a fixture 32 and advances the fixture 32 very precisely to the next work position of the fixture.

To prevent the supply of fixtures coming forward on the conveyer belt 35 from jarring the forward one of the fixtures 32 from its work position at a work station, there is provided suitable stop means synchronized with the drive mechanism and engageable with the next one of the fixtures for retarding the advancement thereof until the drive mechanism has advanced the forward one of the fixtures out of the path of travel. Specifically the stop mechanism includes a plurality of spaced apart stop members 56 (FIG. 6) individually represented as 56A, 56B, 56C, 56D, and 56E. Each of the stop members is spring biased toward a fixture by a compression spring 57. Moreover, each of the stop members 56 carries a suitable cam follower or roller 58. A retracting bar 60 is provided having a plurality of cam lobes 60A engageable with the rollers 58 to retract the stop members 56. The retracting bar 60 is connected to the drive bar 47 by a suitable drive pin 62 (FIGS. 7 and 8) which rides in a lost motion slot 63 in the retracting bar 60. Thus, the stop members 56 are retracted in synchronism with the drive mechanism, but with a delay following the beginning of the advance and retract strokes of the drive bar 47.

Each of the stop members 56 is biased toward the row of fixtures 32, and all but one of the stop members 56 ride on the side surface of the base thereof. Each of the fixtures 32 is provided with a groove or recess 64 in the side surface of its base providing for the projection of a selected one of the stop members 56 into the path of travel of the following fixture.

Figure 9:
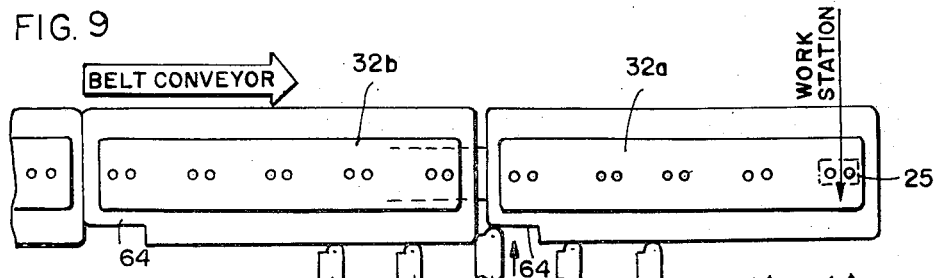
FIGS. 9–14 represent a sequence of positions on the drive mechanism and stop means of the stop motion conveyer illustrating the step-by-step advance of the work holders.
Figure 9A:
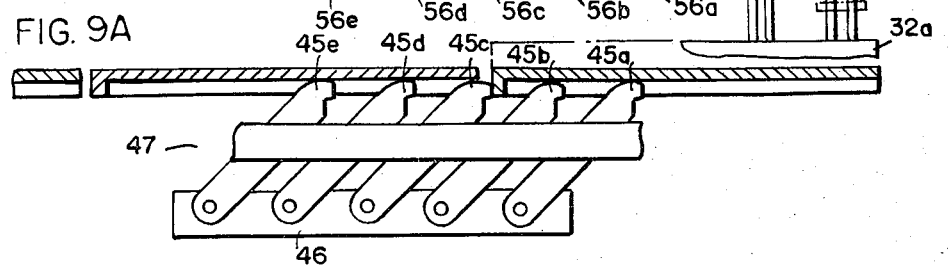

From the above detailed description of the stop motion conveyer, the step-by-step advance of a fixture 32 past the work station is believed clear. However, such interaction between the drive mechanism and the stop mechanism may be more clearly understood from the sequence drawings of FIGS. 9-14. As therein illustrated, referring first to FIGS. 9 and 9A, there is illustrated the position of the work fingers 45 and stop members 56 at a position in the operating cycle with the cam and crank assembly 42 in the position illustrated in FIG. 8. As therein illustrated, the next cycle of operation is that the lobe 54A of the crank and cam assembly 42 engages and rotates the control lever 50 counterclockwise, raising the support bar 46 and moving the fingers 45 into a disengaged position with respect to the fixtures 32. At the same time, in the illustrated embodiment, stop member 56C projects into the recess 64 of the fixture 32A and stops the forward movement of the succeeding fixture 32B so as not to drive the fixture 32A aligned at the work station out of accurate alignment therewith.

Figure 10:
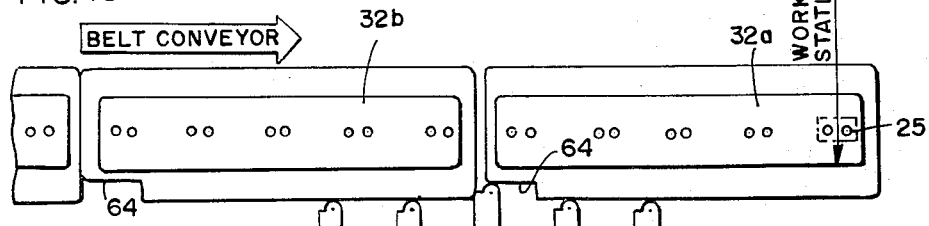
Figure 10A:
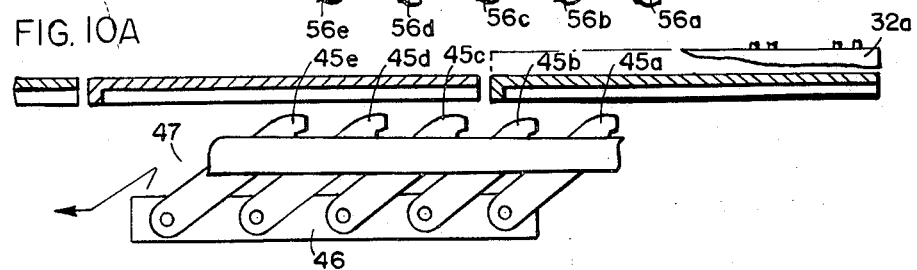
Figure 11:
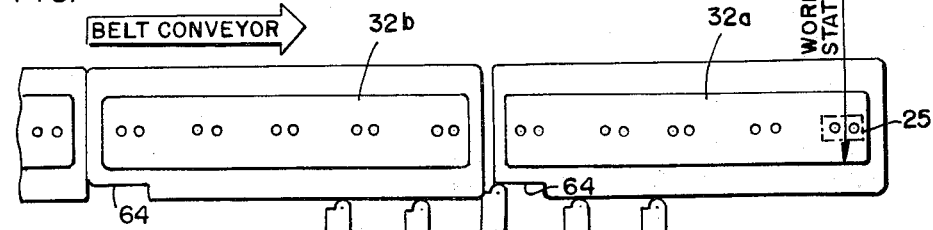
Figure 11A:
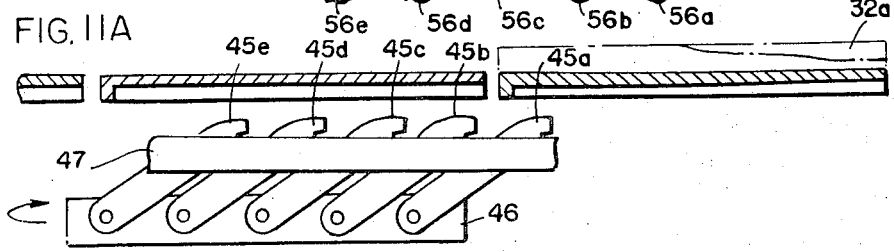

Referring to FIG. 10, the fingers 45 have moved into a retracted position, and the drive bar 47 is beginning its return stroke, moving to the left as illustrated in FIG. 10A. Because of the lost motion connection between the pin 62 and the retracting bar 60, the stop member 56C still projects into the path of travel of the fixture 32B and inhibits the forward movement thereof. As illustrated in FIGS. 11 and 11A, the lobe 54A of the crank and cam assembly 42 will pass the cam follower 43 providing for movement of the fingers 45 back into an engageable position. The stop member 56C still inhibits forward movement of the fixture 32B.

Figure 12:
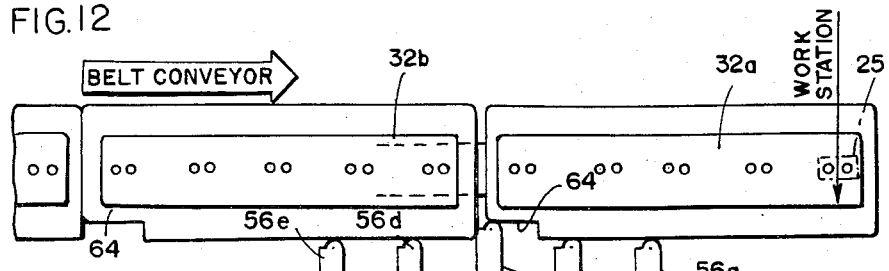
Figure 12A:
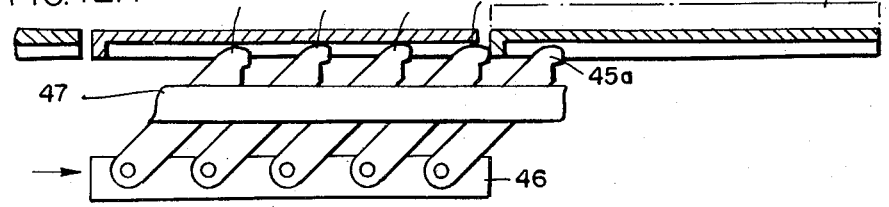
Figure 13:
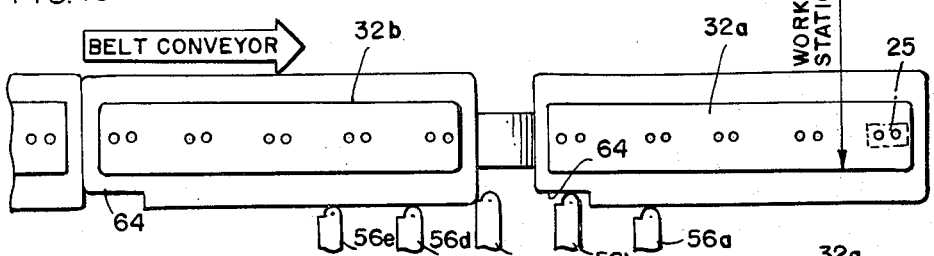
Figure 13A:
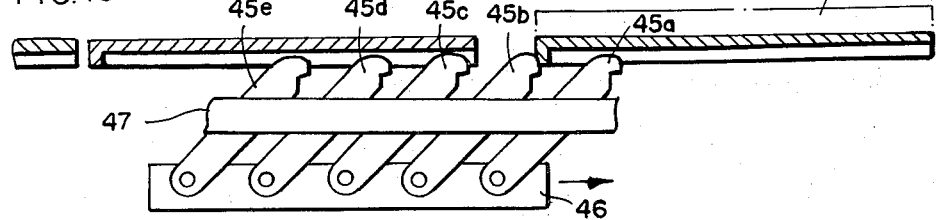

As illustrated in FIG. 12, the drive bar 47 has begun its advance stroke, and the drive finger 45B has now engaged the edge of the base of fixture 32A. Continued forward movement of the drive bar 47 will advance the fixture 32A one work position due to engagement of the drive finger 45B with the edge of the base thereof. At the same time the retracting bar 60 will be effective to withdraw the stop members 56 into a retracted position, permitting advance of the fixture 32B.

Figure 14:
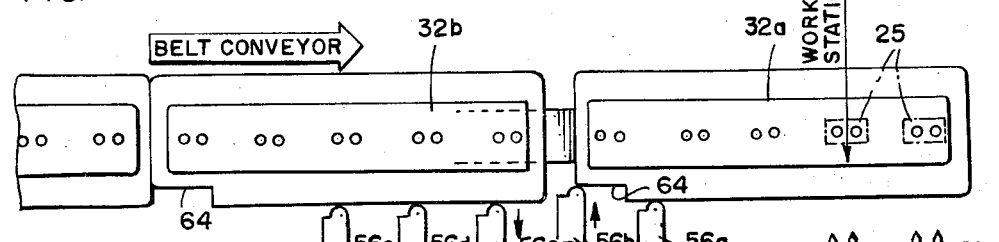
Figure 14A:
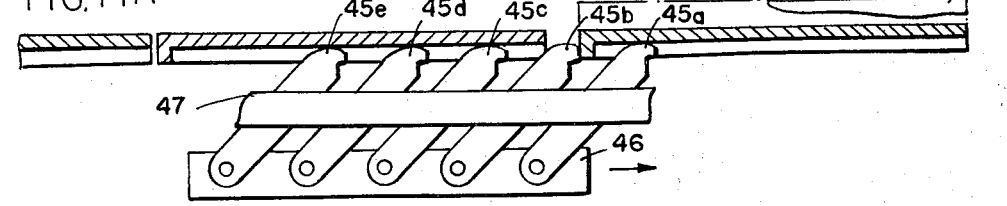

As the drive bar 47 completes its advance stroke, as illustrated in FIGS. 14 and 14A, the fixture 32A will be advanced to provide another of its work positions at the work station. At the same time, the retracting bar 60 will have been returned to the position illustrated in FIG. 6, and the stop member 56B will move into the groove 64 of the fixture 32A. In this position the stop member 56 will define a stop for the succeeding fixtures 32B inhibiting forward movement thereof. The work fixture 32A is now properly aligned for a work process which, in the illustrated embodiment, comprises the assembly of one or more of the parts 25 from the automatic assembly machine 24. Such assembly takes place by a suitable position sensing device, such as the actuation of a microswitch 67 controlled by a cam lobe 68 on the end of the drive bar 47.

From the above detailed description of the automatic assembly system 20 and the operation of the stop motion conveyer 22 thereof, it will be understood that there has been provided an arrangement which will accurately locate a work holder in a work position at a work station, and will advance such work holder in step-by-step relation through the work station sequentially aligning the work positions at the work station. Additionally, the stop motion conveyer 22 will advance subsequent work holders from a continuous supply thereof in step-by-step relation through the work station. The positioning mechanism includes a drive mechanism reciprocable through advance and return strokes for advancing the forward one of the series of work holders in step-by-step relation past the work station and additionally includes stop means synchronized with a drive mechanism and engageable with the following one of the work holders for retarding or inhibiting the advancement thereof until the work holder at the work station has moved out of the path of travel thereof.

Although the present invention has been described by reference to only a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. In combination,
    a plurality of work holders, each of said work holders including a base having a finger engaging projection and a rearwardly opening groove; and
    a positioning mechanism for advancing each of said work holders in step-by-step relation through a work station, each of said work holders having a plurality of work positions sequentially alignable at said work station, said mechanism including;
    table means supporting said work holders through said work station,
    a drive mechanism reciprocable through advance and return strokes and including a reciprocable drive bar having a plurality of pivoted drive fingers mounted in spaced relation intermediate their ends sequentially engageable with the finger engaging projection of a forward one of said work holders;
    first drive means including a continuously rotating crank member and a crank rod interconnecting said crank member and said drive bar to reciprocate said drive bar;
    second drive means including a cam mechanism drivingly associated in synchronism with said crank member rotating said fingers into engageable position with said finger engaging projection during an advance stroke and out of engageable position with said finger engaging projection during a return stroke;
    a plurality of spaced stop members projectable against the surface of the base of said forward one of said work holders, said stop members sequentially projecting into said rearwardly opening groove of said forward one of said work holders and into the path of travel of the next one of said work holders; and
    retracting means for retracting said stop members in synchronism with said drive mechanism to provide advance of said next one of said work holders on said transparent means into engagement with the forward most one of the stop members projected into said rearwardly opening groove.

2. The combination as set forth in claim 1 wherein said transport means consists of a continuously driven conveyer carrying a plurality of said work holders in abutting relation against said stop means, said conveyer being over-driven relative to the advance of said work holders whereby slippage between said conveyer and said work holders continuously biases said plurality of work holders in the direction of said work station.

3. The combination as set forth in claim 1 and including means for retracting said stop members in synchronism with said drive mechanism to provide advance of said next one and the remaining ones of said work holders on said transport means.

4. The combination as set forth in claim 1 wherein said positioning mechanism advances said work piece a fraction of the length of said work piece only for each advance stroke of said drive mechanism.

* * * * *